(12) United States Patent
Tayebati et al.

(10) Patent No.: US 11,433,479 B2
(45) Date of Patent: Sep. 6, 2022

(54) POLARIZATION-ADJUSTED BEAM OPERATION FOR MATERIALS PROCESSING

(71) Applicants: Parviz Tayebati, Sherborn, MA (US); Wang-Long Zhou, Andover, MA (US); Bien Chann, Merrimack, NH (US); Robin Huang, North Billerica, MA (US)

(72) Inventors: Parviz Tayebati, Sherborn, MA (US); Wang-Long Zhou, Andover, MA (US); Bien Chann, Merrimack, NH (US); Robin Huang, North Billerica, MA (US)

(73) Assignee: TeraDiode, Inc., Wilmington, MA (US)

( * ) Notice: Subject to any disclaimer, the term of this patent is extended or adjusted under 35 U.S.C. 154(b) by 338 days.

(21) Appl. No.: 16/658,462

(22) Filed: Oct. 21, 2019

(65) Prior Publication Data

US 2020/0114466 A1 Apr. 16, 2020

Related U.S. Application Data

(63) Continuation of application No. 15/864,145, filed on Jan. 8, 2018, now Pat. No. 10,486,265, which is a continuation of application No. 14/639,401, filed on Mar. 5, 2015, now Pat. No. 9,889,524.

(60) Provisional application No. 61/948,205, filed on Mar. 5, 2014.

(51) Int. Cl.
*B23K 26/08* (2014.01)
*B23K 26/06* (2014.01)
*B23K 26/064* (2014.01)
*B23K 26/38* (2014.01)
*G02B 27/28* (2006.01)
*B23K 26/21* (2014.01)

(52) U.S. Cl.
CPC .......... *B23K 26/08* (2013.01); *B23K 26/0604* (2013.01); *B23K 26/064* (2015.10); *B23K 26/21* (2015.10); *B23K 26/38* (2013.01); *G02B 27/281* (2013.01)

(58) Field of Classification Search
CPC ................ B23K 26/707; B23K 26/046; B23K 26/0648; B23K 26/0617; B23K 26/342; B23K 26/073; B23K 26/0626; B23K 26/082; B33Y 10/00; B33Y 40/00; G02B 26/0875; G02B 26/10; H01S 3/067; H01S 3/1603; H01S 3/17
See application file for complete search history.

(56) References Cited

U.S. PATENT DOCUMENTS

| | | | |
|---|---|---|---|
| 9,889,524 B2 | 2/2018 | Tayebati et al. | |
| 2006/0091126 A1 | 5/2006 | Baird et al. | |
| 2006/0169677 A1* | 8/2006 | Deshi | H05K 3/0035 219/121.7 |
| 2008/0136742 A1 | 6/2008 | Tegreene et al. | |
| 2008/0291232 A1* | 11/2008 | Yamada | B41J 2/04573 347/14 |

(Continued)

*Primary Examiner* — Brian W Jennison
(74) *Attorney, Agent, or Firm* — Morgan, Lewis & Bockius, LLP

(57) ABSTRACT

Systems and techniques for optimizing the operation of a beam emitter during material processing maintain an optimal polarization of the beam with respect to the material throughout processing—e.g., even as the beam path varies or the nature or thickness of the material changes.

20 Claims, 4 Drawing Sheets

(56) References Cited

U.S. PATENT DOCUMENTS

2012/0325784 A1* 12/2012 Moffatt .................. B23K 26/03
                                                        219/121.61
2015/0251273 A1     9/2015  Tayebati et al.
2018/0126490 A1     5/2018  Tayebati et al.

* cited by examiner

POLARIZATION-ADJUSTED BEAM OPERATION FOR MATERIALS PROCESSING

CROSS-REFERENCE TO RELATED APPLICATIONS

This application is a continuation of U.S. patent application Ser. No. 15/864,145, filed Jan. 8, 2018, which is a continuation of U.S. patent application Ser. No. 14/639,401, filed Mar. 5, 2015, which claims priority to and the benefit of U.S. Provisional Patent Application No. 61/948,205, filed on Mar. 5, 2014, the entire disclosure of each of which is hereby incorporated herein by reference.

FIELD OF THE INVENTION

In various embodiments, the present invention relates generally to beam-emission systems, and more particularly to systems and techniques for processing materials.

BACKGROUND

High-power lasers are used in many cutting, etching, annealing, welding, drilling, and soldering applications. As in any materials-processing operations, efficiency can be a critical limiting factor in terms of expense and time; the lower the efficiency, the higher will be the cost and/or the slower will be the operation of the laser deployed to process a given material. The brightness and polarization of the laser beam can influence efficiency, and different materials (such as copper, aluminum, steel, and so forth) respond differently to beam polarization as they are processed. Moreover, the thicknesses of these materials can affect their polarization response. That is, the nature of a cut or weld may vary with the beam polarization depending on the material and its thickness. For example, a linearly polarized processing beam may be absorbed differently depending on the orientation of the beam's polarization with respect to the cut front. For this reason, laser-processing systems sometimes utilize circularly or randomly polarized laser output in order to avoid directionally dependent polarization responses. While that approach avoids the efficiency-degrading results of unfavorable polarization orientations, it likewise precludes the benefits of favorable orientations.

Accordingly, there is a need for improved systems and techniques for enhancing the efficiency of laser processing operations that exploit the varying responses to beam polarization that characterize different materials and material thicknesses.

SUMMARY

Embodiments of the invention provide systems and techniques for optimizing the polarization of a beam during processing, and maintaining the optimal polarization throughout processing—e.g., even as the beam path varies or the nature or thickness of the material changes.

Accordingly, in a first aspect, the invention relates to a system for processing a workpiece. In various embodiments, the system comprises a beam emitter, a positioning device for varying a position of a beam of the beam emitter with respect to the workpiece, a variable polarizer for varying a polarization of the beam, and a controller, coupled to the positioning device and the polarizer, for operating the beam emitter cause the beam to traverse a path across at least a portion of the workpiece for processing thereof and to maintain a consistent polarization of the beam with respect to the workpiece along the path.

In various embodiments, the variable polarizer comprises a wave plate and a rotation element, the rotation element being operated by the controller. For example, the wave plate may be one or more half-wave plates, one or more quarter-wave plates, or some combination thereof. The beam may, for example, be linearly polarized, with the controller operating the rotation element to maintain a polarization direction parallel to the path.

In some embodiments, the system further comprises a memory, accessible to the controller, for storing data corresponding to the path, and a database for storing polarization data for a plurality of materials. The controller is configured to query the database to obtain the polarization data for a material of the workpiece, and the polarization data determines the consistent polarization of the beam. The path may include at least one directional change.

The beam emitter may emit a plurality of beams. The beam emitter may be at least one laser and/or at least one polarized fiber.

In another aspect, the invention pertains to a method of processing a workpiece. In various embodiments, the method comprises the steps of operating a beam emitter to direct a beam traversing a path along the workpiece to process the workpiece, where the beam has an output polarization; and altering the output polarization along at least a portion of the path so as to maintain a consistent polarization of the beam with respect to the workpiece throughout processing thereof.

The step of processing the workpiece may comprise one or more of cutting, welding, soldering, drilling, or etching the workpiece. The step of altering may comprise directing the beam through a wave plate and varying a rotation angle of the wave plate with respect to the beam. For example, the wave plate may be one or more half-wave plates and/or one or more quarter-wave plates. The beam may, for example, be linearly polarized, and the altering step maintains a polarization direction of the beam parallel to the path.

In some embodiments, the method further comprises the steps of storing data corresponding to the path, storing polarization data for a plurality of materials, and querying the database to obtain the polarization data for a material of the workpiece, the polarization data determining the consistent polarization of the beam. The path may include at least one directional change.

As used herein, the term "optical element" may refer to any of lenses, mirrors, prisms and the like which redirect, reflect, bend, or in any other manner optically manipulate electromagnetic radiation. The term "beam" includes any form of directed electromagnetic radiation. "Beam emitters" include any electromagnetic beam-generating device that generates a beam of electromagnetic radiation, and which may or may not be self-resonating. Beam emitters include free-space (e.g., cavity) laser, fiber lasers, disk lasers, non-solid state lasers and so forth. A beam emitter may, in some instances, include a back reflective surface, at least one optical-gain medium, and a front reflective surface. The optical gain medium refers to increasing the gain of electromagnetic radiation and is not limited to the visual, IR or ultraviolet portions of the electromagnetic spectrum. An emitter may including multiple beam emitters, e.g., a diode bar configured to emit multiple beams. A beam may be single-wavelength or multi-wavelength.

The term "substantially" or "approximately" means ±10% (e.g., by weight or by volume), and in some embodiments, ±5%. The term "consists essentially of" means excluding other materials that contribute to function, unless otherwise defined herein. Nonetheless, such other materials may be present, collectively or individually, in trace amounts. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing will be more readily understood from the following detailed description of the invention, in particular, when taken in conjunction with the drawings, in which.

DETAILED DESCRIPTION

Aspects and embodiments relate generally to the field of adjusting polarization of a laser beam used in manufacturing, so as to produce better manufacturing results including less dross and clean cuts and welds. In various embodiments, therefore, the present invention relates to optimizing the polarization of a laser beam with respect to a material undergoing processing. More particularly, systems and methods for adjusting polarization may involve varying the orientation of a wave plate through which the beam passes in order to selectively vary the polarization thereof, e.g., based on the geometry, material and thickness of the material undergoing processing and the instantaneous orientation of the beam with respect thereto. The approaches and embodiments described herein may apply to single- and dual-beam output systems that use polarization-maintaining optical fibers to deliver the output beams from the laser system to a laser head. In some instances, these laser systems may be wavelength beam-combining systems, which produce a multi-wavelength output beam.

Figure 1:
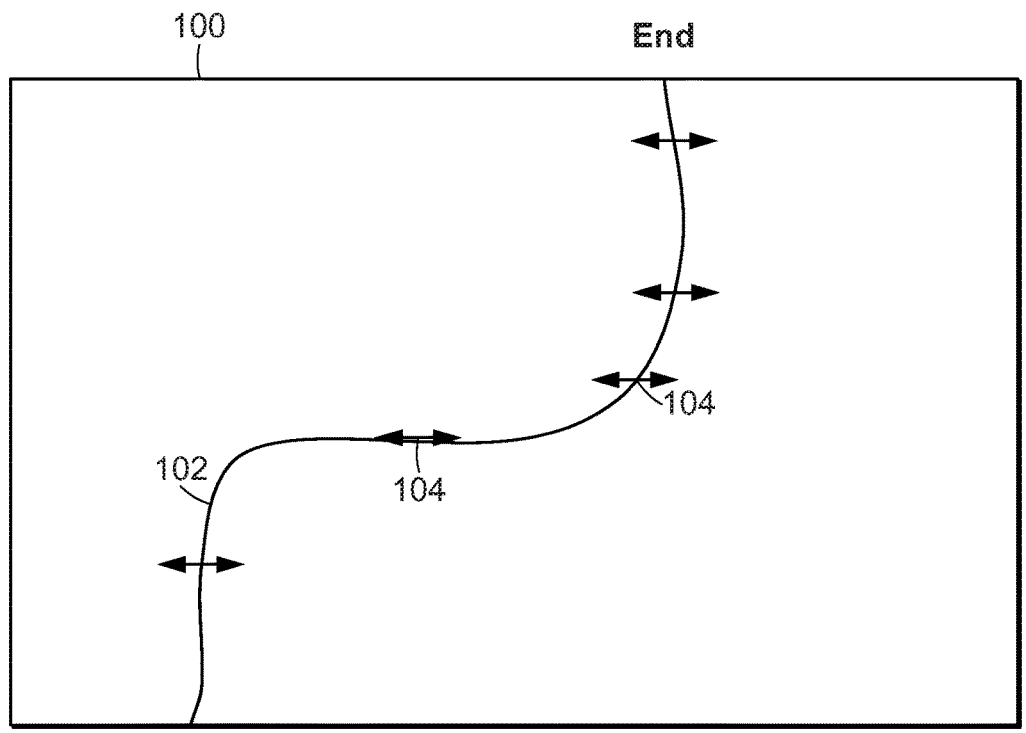
FIG. 1 illustrates a prior method of cutting a curve out of material with the polarization of the cutting beam being fixed.

Thus, embodiments of the present invention establish an optimal polarization direction for a given material and maintain this direction with respect to the processing direction as processing proceeds. This is in contrast to the behavior of prior-art systems, as exemplified in FIG. 1, that do not alter the polarization direction. In FIG. 1, a sheet 100 of material is processed by a linearly polarized beam that follows a desired cutting path 102, which is curved. The linear polarization, indicated at 104, maintains a fixed orientation regardless of the varying orientation of the beam relative to the material 100. In many systems, the optimal beam polarization is parallel to the direction of processing. In FIG. 1, this occurs only once, and in fact, at most locations, the polarization is disadvantageously perpendicular to the processing direction. This may retard the processing, produce dross, create an imperfect cut, etc.

Figure 2:
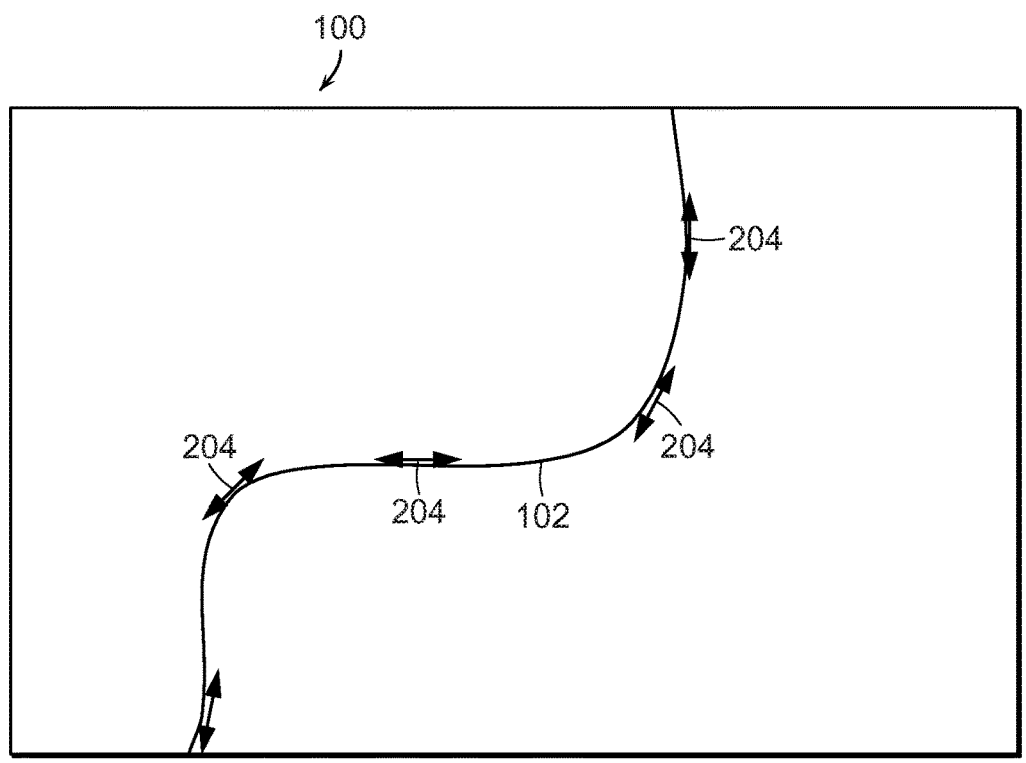
FIG. 2 illustrates an exemplary adjustment of polarization according to the cutting path in the material.
Figure 3A:
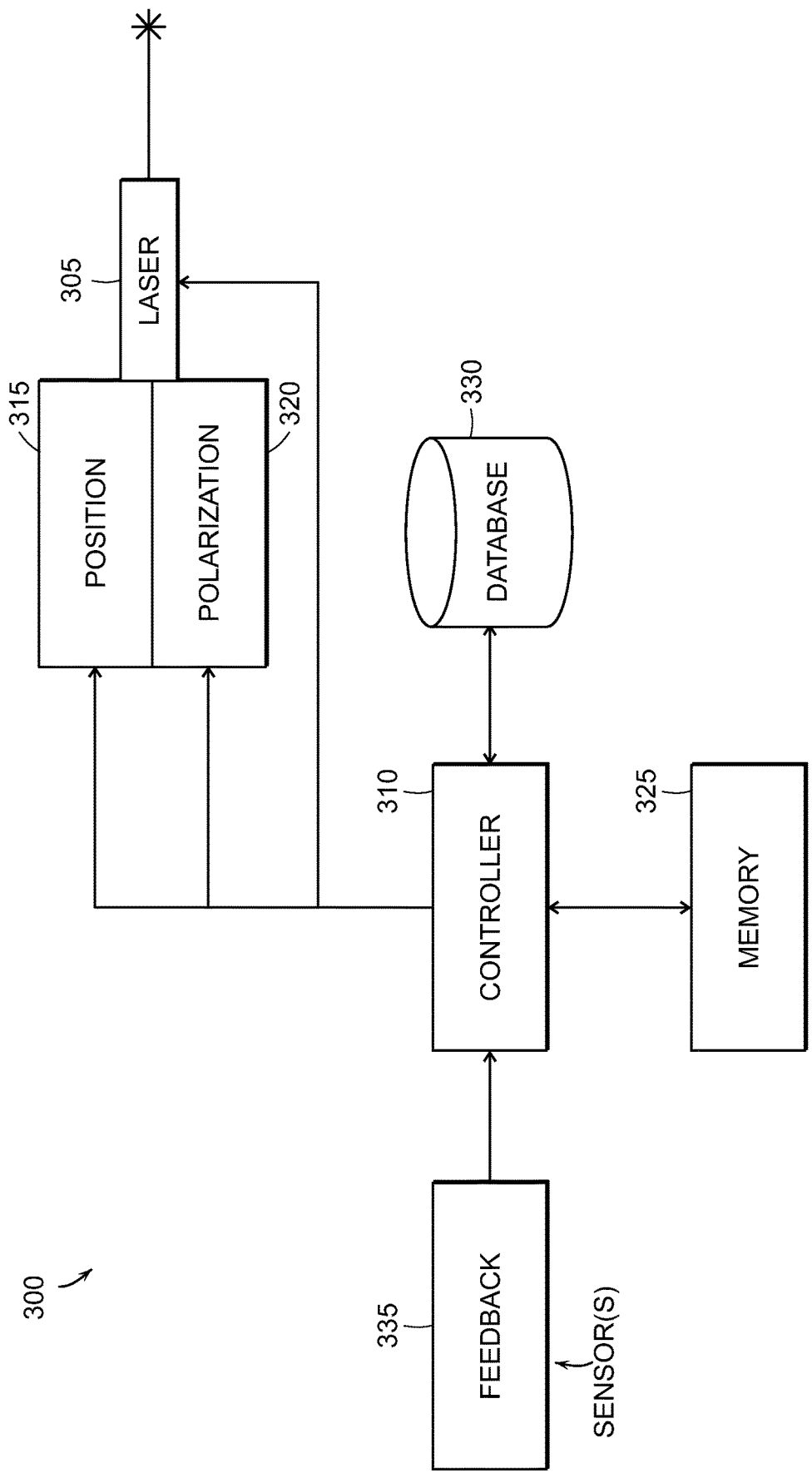
FIGS. 3A-3C illustrate an exemplary system for maintaining a consistent beam polarization relative to a processing direction.
Figure 3B:
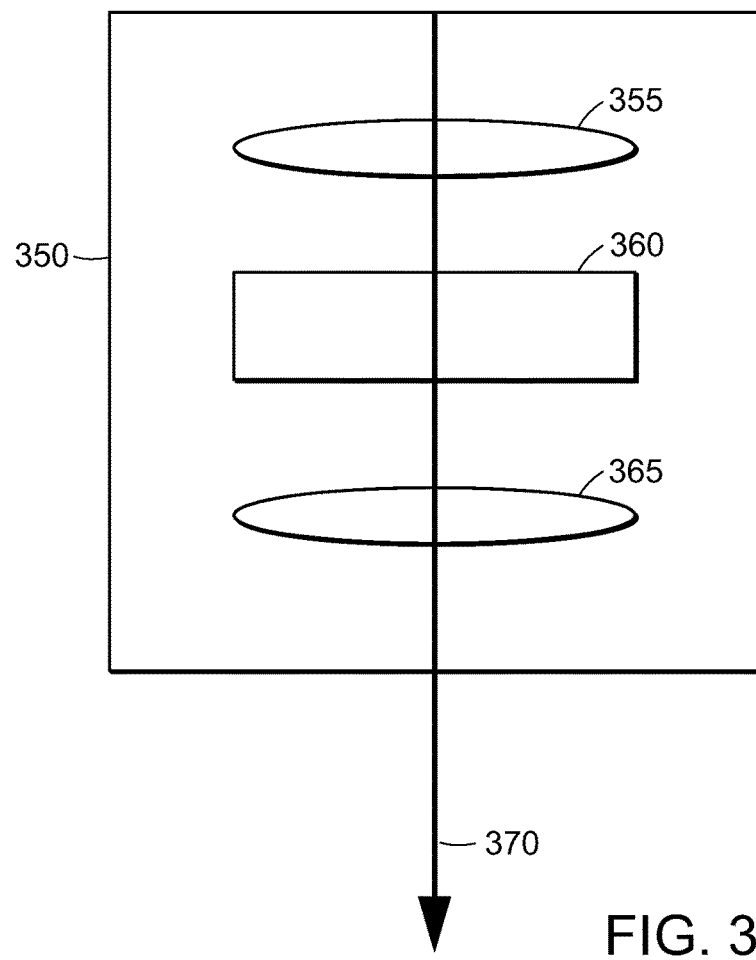
Figure 3C:
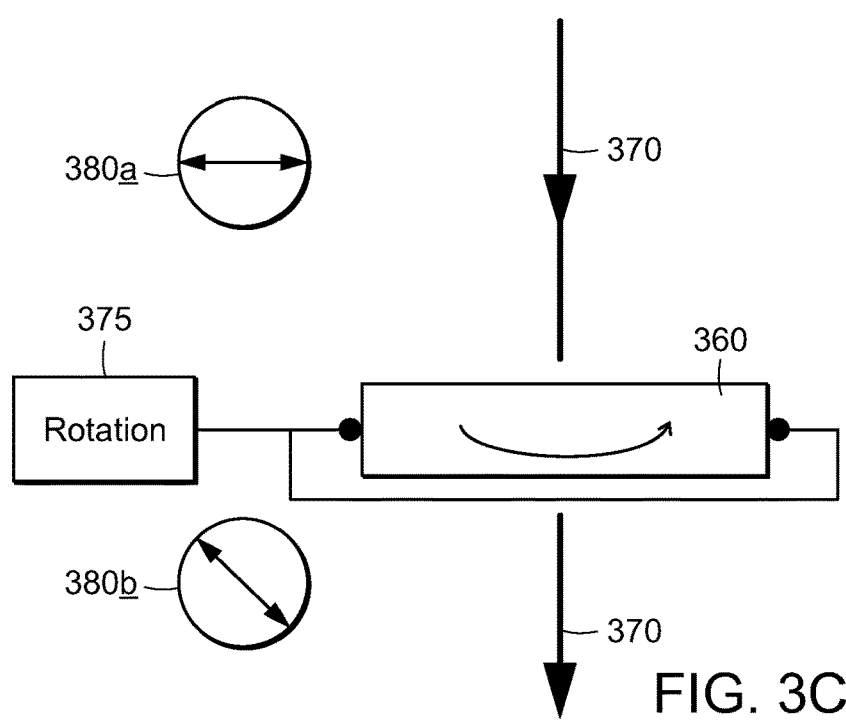

The optimal behavior for the exemplary system is illustrated FIG. 2: the polarization orientation 204 of the processing beam remains parallel to the processing direction throughout the processing path 102. A representative system for accomplishing this is shown in FIGS. 3A-3C. With reference to FIG. 3A, the system 300 includes a laser (or other beam emitter, such as a polarized fiber) 305 and a controller 310. The controller 310 controls the operation of the laser 305 (i.e., it actives the laser 305 and controls beam parameters, such as intensity, as appropriate during processing). The controller also operates a conventional positioning system 315 and a polarizer 320. The positioning system may be any controllable optical, mechanical or opto-mechanical system for directing the beam through a processing path along a two- or three-dimensional workpiece. During processing, the controller may operate the positioning system 315 and the laser 305 so that the laser beam traverses a processing path along the workpiece. The processing path may be provided by a user and stored in an onboard or remote memory 325, which may also store parameters relating to the type of processing (cutting, welding, etc.) and the beam parameters necessary to carry out that processing. In this regard, a local or remote database 330 may maintain a library of materials and thicknesses that the system 300 will process, and upon user selection of material parameters (type of material, thickness, etc.), the controller 310 queries the database 330 to obtain the corresponding parameter values. The stored values may include a polarization orientation suitable to the material.

As is well understood in the plotting and scanning art, the requisite relative motion between the beam and the workpiece may be produced by optical deflection of the beam using a movable mirror, physical movement of the laser using a gantry, lead-screw or other arrangement, and/or a mechanical arrangement for moving the workpiece rather than (or in addition to) the beam. The controller 310 may, in some embodiments, receive feedback regarding the position and/or processing efficacy of the beam relative to the workpiece from a feedback unit 335, which will be connected to suitable monitoring sensors. In response to signals from the feedback unit 335, the controller 310 alters the path, composition and/or polarization of the beam.

In one embodiment shown in FIGS. 3B and 3C, polarization adjustment is accomplished within a laser head component 350, which is usually the last opto-mechanical portion of a laser system emitting a beam used in manufacturing. The laser head 350 includes a collimating lens 355, an adjusting/rotating wave plate 360, and a focusing lens 365 to direct beam 370 onto the surface of the workpiece. The wave plate 360 may be a quarter-wave plate, a half-wave plate, or other wave plate for rotating the polarization of the beam 370. With reference to FIGS. 3A-3C, a conventional electro-mechanical rotating device 375 rotates the wave plate 360 under the control of the controller 310 as the beam moves through the processing path 102, thus enforcing a consistent polarization direction of the beam 370 relative to the path 102. In other configurations, multiple wave plates may be employed and separately rotated by individual rotating devices 375. The use of multiple wave plates may improve response time. The polarization of the beam 370 is shown at a first orientation 380a prior to encountering the wave plate 360 and at a second orientation 380b after passing through the wave plate 360.

Figure 4:
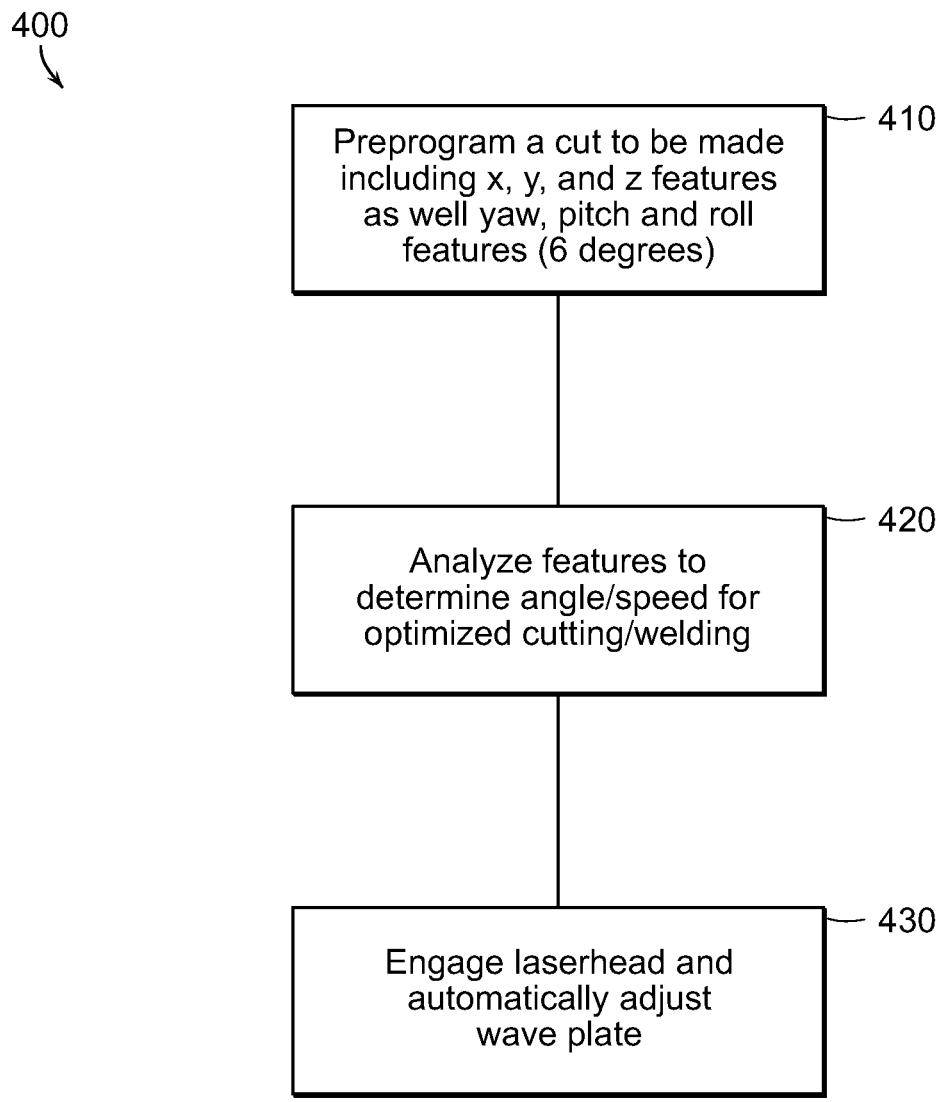
FIG. 4 illustrates a method for cutting or welding a material using an automatically adjusting polarization beam.

FIG. 4 illustrates a representative method 400 of operating the system 300 to perform a cutting operation. In a first step 410, the user preprograms the desired path into the system 300 using any suitable input device or by means of file transfer. In step 420, the controller 310 analyzes the curves, features and cutting direction of the path, queries the database 330 as necessary, determines how fast the cut can be made, and determines the optimal polarization of the laser beam relative to the cutting direction. In operation, indicated at step 430, the controller 330 operates the laser 305 and subsystems 315, 320 to cut along the preprogrammed path, maintaining the proper polarization orientation. If the composition and/or thickness of the material being processed changes, the location and nature of the of change can be programmed, and the controller 310 can adjust the laser beam parameters (including polarization) accordingly. It should be noted that the optimal cutting, welding or manufacturing solution may not necessarily be the cleanest cut or weld, because additional steps in the process are typically needed regardless. Thus overall optimization may be based on the desired output, and the present methods and systems are configured to produce those desired results whatever they may be. As noted earlier, cutting is only one example of laser processing that may benefit from the approach of the present invention.

The controller 310 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C #, BASIC, various scripting languages, and/or HTML. Additionally, the software may be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

Although the methods described herein for improving processing work well for linearly polarized beams (delivered via a free-space laser or polarization-maintaining fiber), the techniques also work with elliptically polarized beams (dominated by one polarization) as well. For example, a beam from a standard multimode fiber would be likely elliptically polarized and could benefit from the approach described herein.

The above description is merely illustrative. Having thus described several aspects of at least one embodiment of this invention including the preferred embodiments, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for processing a workpiece along a path extending across at least a portion of a surface of the workpiece, the system comprising:
   a beam emitter;
   a positioning device for varying a position, of a beam of the beam emitter, at which the beam is emitted onto a surface of the workpiece;
   a variable polarizer for varying a polarization of the beam; and
   a controller, coupled to the positioning device and the polarizer, for (i) operating the beam emitter to cause the beam to traverse the path for processing of the workpiece, and (ii) maintaining a consistent polarization of the beam with respect to the workpiece along the path, the controller being configured to alter the polarization of the beam at one or more points along the path at which a direction of the path across the surface of the workpiece changes.

2. The system of claim 1, wherein the path is curvilinear.

3. The system of claim 1, wherein the variable polarizer comprises a wave plate and a rotation element, the rotation element being operated by the controller.

4. The system of claim 3, wherein the wave plate is a half-wave plate.

5. The system of claim 3, wherein the wave plate is a quarter-wave plate.

6. The system of claim 3, wherein the beam is linearly polarized and the controller operates the rotation element to maintain a polarization direction parallel to the path.

7. The system of claim 1, wherein the beam is linearly polarized and the controller is configured to maintain a polarization direction of the beam parallel to the path.

8. The system of claim 1, further comprising:
   a memory, accessible to the controller, for storing data corresponding to the path; and
   a database for storing polarization data for a plurality of materials,
   wherein the controller is configured to query the database to obtain the polarization data for a material of the workpiece, the polarization data determining the consistent polarization of the beam.

9. The system of claim 1, wherein the variable polarizer is disposed within a laser head component configured to emit the beam onto the surface of the workpiece, further comprising an optical fiber for delivering the beam from the beam emitter to the laser head component.

10. The system of claim 1, wherein the beam emitter emits a plurality of beams.

11. The system of claim 1, wherein the beam emitter emits a multi-wavelength beam.

12. A method of processing a workpiece using an optical beam, the method comprising:
   receiving a desired one-dimensional processing path extending across at least a portion of a surface of the workpiece;
   computationally determining a consistent polarization for the beam along the path based at least in part on one or more changes of a processing direction along the path;
   operating a beam emitter to direct the beam along the path to process the workpiece, the beam having an output polarization; and
   controlling the output polarization of the beam so as to maintain the consistent polarization of the beam as the beam traverses the path.

13. The method of claim 12, wherein the path is curvilinear.

14. The method of claim 12, wherein computationally determining the consistent polarization for the beam along the path comprises querying a database storing beam parameters associated with processing types and/or material compositions.

15. The method of claim 12, wherein processing the workpiece comprises at least one of cutting, welding, soldering, drilling, or etching the workpiece.

16. The method of claim 12, wherein the controlling step comprises directing the beam through a wave plate and varying a rotation angle of the wave plate with respect to the beam.

17. The method of claim 16, wherein the wave plate is a half-wave plate.

18. The method of claim 16, wherein the wave plate is a quarter-wave plate.

19. The method of claim 12, wherein the beam is linearly polarized and the controlling step maintains a polarization direction of the beam parallel to the path.

20. The method of claim 12, further comprising, while the beam is being directed along the path, (i) receiving feedback from one or more sensors regarding a position and/or processing efficacy of the beam relative to the workpiece, and (ii) altering the path and/or the output polarization of the beam in response to the feedback.

* * * * *